(12) United States Patent
    Stojanovski et al.

(10) Patent No.: US 11,129,072 B2
(45) Date of Patent: Sep. 21, 2021

(54) SYSTEMS, METHODS, AND APPARATUSES FOR MANAGING MULTIPLE ANCHORS FOR MULTI-HOMING

(71) Applicant: Apple Inc., Cupertino, CA (US)

(72) Inventors: Alexandre Saso Stojanovski, Paris (FR); Danny Moses, Reut (IL); Wu-Chi Feng, Tigard, OR (US)

(73) Assignee: APPLE INC., Cupertino, CA (US)

( * ) Notice: Subject to any disclaimer, the term of this patent is extended or adjusted under 35 U.S.C. 154(b) by 29 days.

(21) Appl. No.: 16/487,706

(22) PCT Filed: Feb. 26, 2018

(86) PCT No.: PCT/US2018/019658
§ 371 (c)(1),
(2) Date: Aug. 21, 2019

(87) PCT Pub. No.: WO2018/157030
PCT Pub. Date: Aug. 30, 2018

(65) Prior Publication Data
US 2020/0015137 A1    Jan. 9, 2020

Related U.S. Application Data

(60) Provisional application No. 62/464,226, filed on Feb. 27, 2017.

(51) Int. Cl.
    *H04W 36/12* (2009.01)
    *H04W 84/04* (2009.01)
(52) U.S. Cl.
    CPC .......... *H04W 36/12* (2013.01); *H04W 84/042* (2013.01)

(58) Field of Classification Search
    CPC ..... H04W 36/12; H04W 36/18; H04W 76/15; H04W 84/042
    (Continued)

(56) References Cited

U.S. PATENT DOCUMENTS

| | | | |
|---|---|---|---|
| 2010/0027508 A1* | 2/2010 | Jee | H04W 36/0011 370/331 |
| 2011/0170479 A1* | 7/2011 | Chan | H04W 8/085 370/328 |

(Continued)

OTHER PUBLICATIONS

Nokia, "Update of Solution 4.13: how to choose which of the UP-GW IP anchors visible to the UE is to be used as the most preferred default router", S2-165587 (was S2-165587), SA WG2 Temporary Document, SA WG2 Meeting #117, Kaohsiung City, Taiwan, Agenda Item 6.10.4, Oct. 17-21, 2016, 5 pages.

(Continued)

*Primary Examiner* — Robert J Lopata
(74) *Attorney, Agent, or Firm* — Stoel Rives LLP

(57) ABSTRACT

Router advertisements may be used to configure multi-homed Protocol Data Unit (PDU) sessions. A first router advertisement message from a first PDU session anchor and a second router advertisement message from a second PDU session anchor may be decoded. A user equipment (UE) may identify, based on the first and second router advertisement messages, a first preference value associated with destination routes of the first network and a second preference value associated with destination routes of the second data network. The UE may determine a destination data network for a signal by comparing a destination route of the signal to destination routes associated with whichever data network has a greater preference value. The UE may prepare the signal with a prefix based on the destination data network.

23 Claims, 11 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2014/0071820 A1* | 3/2014 | Melia | H04W 28/08 |
| | | | 370/230 |
| 2014/0321328 A1* | 10/2014 | Zuniga | H04W 8/24 |
| | | | 370/254 |
| 2016/0309524 A1* | 10/2016 | Barreto De Miranda Sargento .... | |
| | | | H04W 76/10 |
| 2018/0270715 A1* | 9/2018 | Lee | H04W 36/0022 |
| 2019/0124181 A1* | 4/2019 | Park | H04W 74/0833 |
| 2019/0306772 A1* | 10/2019 | Othman | H04W 36/32 |
| 2020/0092714 A1* | 3/2020 | Chawre | H04L 61/2007 |
| 2020/0154390 A1* | 5/2020 | Kim | H04L 65/1016 |

OTHER PUBLICATIONS

PCT/US2018/019658, International Search Report and Written Opinion, dated Jul. 23, 2018, 25 pages.

Thaler, "Default Router Preferences and More-Specific Routes", Microsoft, Network Working Group, Request for Comments: 4191, Category: Standards Track, Nov. 2005, 15 pages.

* cited by examiner

SYSTEMS, METHODS, AND APPARATUSES FOR MANAGING MULTIPLE ANCHORS FOR MULTI-HOMING

RELATED APPLICATIONS

This application is a non-provisional of U.S. Provisional Patent Application No. 62/464,226, filed Feb. 27, 2017, which is incorporated by reference herein in its entirety.

TECHNICAL FIELD

This disclosure generally relates to multi-homed data sessions. Specifically, this disclosure relates to management of a protocol data unit session that can be associated with more than one IPv6 prefix.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN node, such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicates with a wireless communication device, known as user equipment (UE). In fifth generation (5G) wireless networks, also referred to herein as next generation or NextGen systems, an access network (AN) may be referred to herein as a 5G AN or NextGen RAN (NG RAN). A 5G AN or NextGen RAN can include a 5G Node (gNB, new radio Node B (NR NB), or simply AN node). As used herein a core network in the 5G system may be referred to as a 5G core or NextGen core (NGC).

RANs use a radio access technology (RAT) to communicate between the RAN node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION OF PREFERRED EMBODIMENTS

Figure 1:
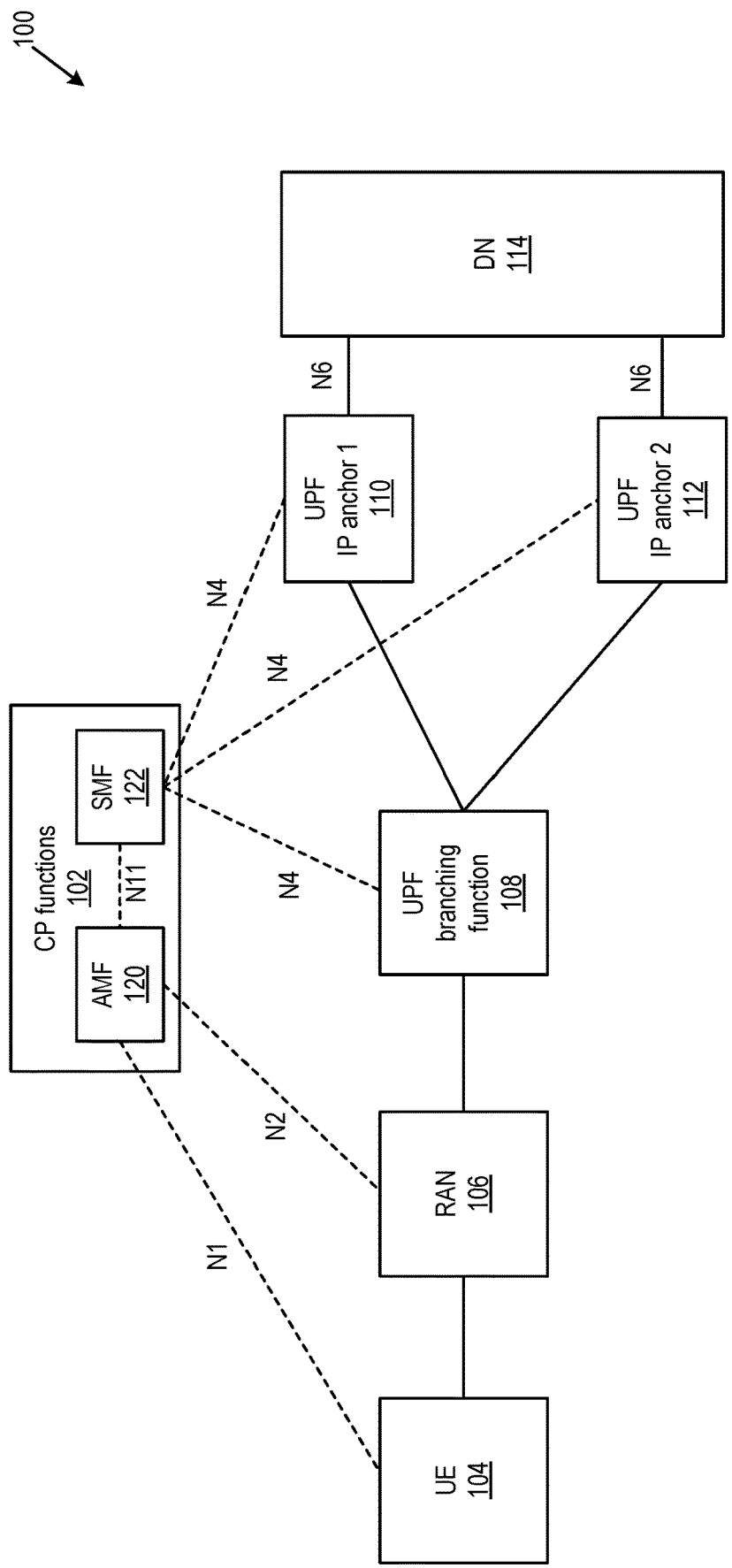
FIG. 1 illustrates a block diagram of a multi-homed Protocol Data Unit (PDU) session established for service continuity, according to one embodiment.

Described herein are systems, methods, and apparatuses for managing a multi-homed data session. In some embodiments, router advertisements may be used to generate multiple Protocol Data Unit (PDU) session anchors. The multiple PDU session anchors may facilitate communications between a UE and one or more networks. In some embodiments, the multiple PDU session anchors may be between a local and a remote data network. In some embodiments, the multiple PDU session anchors may provide service continuity. In some embodiments, the multiple PDU session anchors may facilitate communications between multiple networks concurrently and provide service continuity on one or both of the networks. As used herein, communication or traffic may be used to describe data moving between a network and a UE. The traffic may include, but is not limited to, video, voice, text, short message service messages, and multimedia messaging service messages.

In some implementations, 3GPP does normative work on the architecture for Next Generation System, also known as 5G Phase 1. Session management may be adapted for the architecture of the Next Generation System. For instance, session management can provide support for multi-homed IPv6 PDU sessions. A multi-homed IPv6 PDU session is a PDU session that can be associated with more than one IPv6 prefix (sometimes referred to herein as a prefix).

The multi-homed PDU session can be employed to address two distinct use cases: 1) concurrent access to a remote data network (DN) and a local DN; 2) session and service continuity (SSC) while moving from one geographical location to another. Additionally, the multi-homed PDU session can be employed to address a combination of these two use cases.

A multi-home session may be carried out using multiple source IP prefixes allocated to a UE. This is referred to as a multi-homed PDU session. The PDU session provides access to a data network via more than one separate PDU (IPv6) anchor. The different user plane paths leading to the internet protocol (IP) anchors branch out of a common user plane function (UPF) referred to as a branching point.

A branching point is a logical functionality which may be co-located with other entities (e.g., a UPF for one of the IP anchors). The branching point is a core network functionality. It provides forwarding of uplink traffic towards the different IP anchors (forwarding the traffic towards the different IP anchors) and merge of DL traffic to the UE (merging the traffic from the different IP anchors towards the link towards the UE).

The branching point spreads the uplink traffic between the IP anchors based on the source prefix of the PDU (selected by the UE based on policies received from the network). A router advertisement with a route information option may be used to configure rules into the UE to influence the selection of the source address. This allows the branching point to be unaware of the routing tables in the data network and to keep the first hop router function in the IP anchors.

The multi-homed PDU session may be used to support make-before-break service continuity as described to support SSC mode 3. The multi-homed PDU session may also be used to support cases where the UE needs to access both a local service (e.g., local server) and the Internet.

A branching point for a given session may be inserted or removed by the session management function (SMF) on demand. For example, when a session is first created initially with a single address/prefix, no branching point is needed. When a new address/prefix is added to the session, a branching point may be inserted after the release of the additional addresses/prefixes, and the branching point may be removed by the SMF when there is only a single address/prefix left for the PDU session.

Embodiments of the multi-homed PDU session may assume that there is a shared link connecting the UE with the two (or more) routers. In contrast, today's 3GPP EPS system assumes that there is only a point-to-point link between the UE and the default router (in the 3GPP Evolved Packet System (EPS) today residing in the PDN GW).

Some embodiments herein relate to how to utilize an architecture with two routers on the same link with each router connecting to a separate network. Router advertisement extensions may be used to address the following use cases: (1) concurrent access, (2) service continuity support, and (3) a combination of both. Some embodiments may use an architecture with a host or UE ("host" in internet engineering task force (IETF) parlance or "UE" in 3GPP parlance) connected to a gateway router that connects to two separate networks via two ports.

Various embodiments may use a router advertisement extension to support the requirements of the multi-homed PDU session defined in 3GPP: (1) concurrent access to local and remote data networks; (2) SSC mode 3 for the remote data network; or (3) SSC mode 2 or 3 (but not both of them concurrently) for the local data network.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 illustrates a block diagram of a multi-homed PDU session 100 established for service continuity, according to one embodiment. The multi-homed PDU session 100 may be used to support make-before-break session and service continuity mode 3 (SSC mode 3). The illustrated embodiment provides connections between a UE 104 and a data network 114.

As illustrated, the UE 104 is connected to the data network 114 through two PDU session anchors (i.e., first anchor 110 and second anchor 112). Each PDU session anchor can be associated with a different prefix. The two user plane paths that lead to the PDU session anchors branch out of a common UPF or branching function 108 to provide two different access points to the data network 114.

The branching function 108 is a common UPF sometimes referred to as a "branching point." The branching function 108 provides forwarding of traffic from the UE 104 to the PDU session anchors. The branching function 108 steers the uplink traffic towards one of the anchors based on the source prefix of the uplink packet. The branching function 108 also merges downlink traffic from both the PDU session anchors to the UE 104.

Control Plane (CP) functions 102 may control the branching function 108 and the PDU session anchors. As illustrated, the CP functions 102 may comprise a Access and Mobility Management Function (AMF) 120 and a session management function (SMF) 122. As illustrated, a UE 104 is connected to a RAN 106, as well as the AMF 120 through a first interface N1. The AMF 120 may provide UE-based authentication, authorization, and/or mobility management. The AMF 120 may also connect to the RAN 106 through a second interface N2 to handle or control UE-specific associations.

The SMF 122 may be connected to the branching function 108, the first anchor 110, and the second anchor 112 through interface N4. The SMF 122 is configured for session management and allocates source IP prefixes for UEs. The SMF 122 may also select and control the branching function 108, the first anchor 110, and the second anchor 112 for data transfer.

The SMF 122 may configure the branching function 108 for a multi-homed PDU session. For example, the SMF 122 may assign a first prefix for communications of the UE 104 through the first anchor 110, and assign a second prefix for traffic from the UE 104 through the second anchor 112. The SMF 122 may configure the branching function 108 to direct traffic based on a prefix associated with the traffic. The branching function 108 may be inserted or removed by the SMF 122 as PDU session anchors are added or removed. Further, the SMF 122 may request the two PDU session anchors to send a router advertisement to manage the two PDU sessions. For instance, a router advertisement with a route information option may be used to configure rules into the UE 104 to influence the selection of the prefix.

Figure 2:
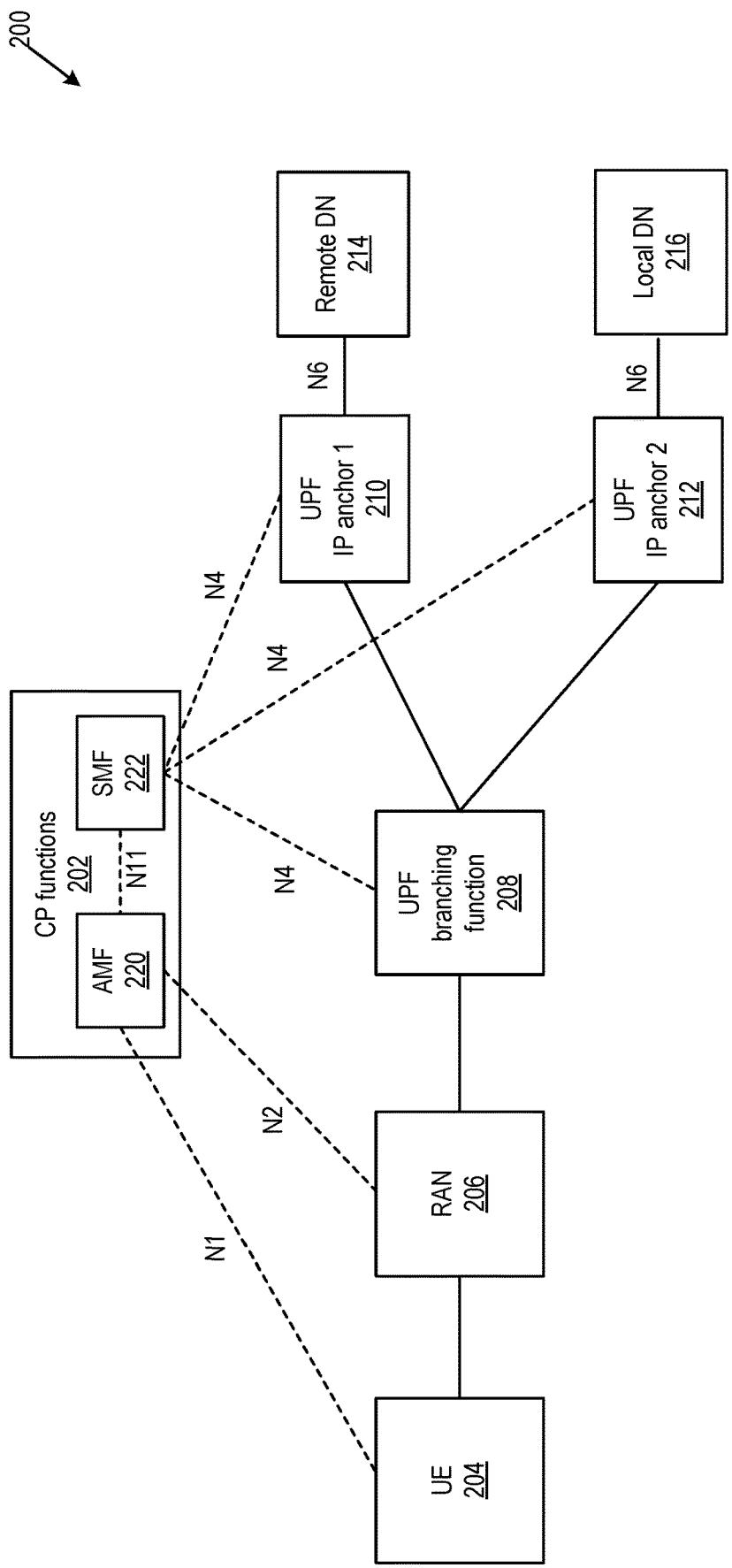
FIG. 2 illustrates a block diagram of a multi-homed PDU session established for concurrent access between a UE and two different data networks, according to one embodiment.

FIG. 2 illustrates a block diagram of a multi-homed PDU session 200 established for concurrent access between a UE 204 and two different data networks, according to one embodiment. The illustrated embodiment provides connections between the UE 204, a local data network 216, and a remote data network 214.

The components of the multi-homed PDU session 200 may behave similarly to the components of the multi-homed PDU session 100 of FIG. 1. For instance, the UE 204 is connected to the remote data network 214 through a first PDU session anchor 210, and to the local data network 216 through a second PDU session anchor 212. Each PDU session anchor is associated with a different prefix. The two user plane paths that lead to the PDU session anchors branch out of a common UPF or branching function 208.

The branching function 208 is a common UPF sometimes referred to as a "branching point." The branching function 208 provides forwarding of traffic from the UE 204 to the PDU session anchors. The branching function 208 steers the uplink traffic towards one or the other anchor based on the source prefix of the uplink packet. The branching function 208 also merges downlink traffic from both the PDU session anchors to the UE 204.

CP functions 202 may control the branching function 208 and the PDU session anchors. As illustrated, the CP functions 202 may comprise an AMF 220 and an SMF 222. As illustrated, the UE 204 is connected to a RAN 206, as well as the AMF 220 through a first interface N1. The AMF 220 may provide UE-based authentication, authorization, and/or mobility management. The AMF 220 may also connect to the RAN 206 through a second interface N2 to handle or control UE-specific associations.

The SMF 222 may be connected to the branching function 208, the first anchor 210, and the second anchor 212 through interface N4. The SMF 222 is configured for session management and allocates IP addresses for UEs. The SMF 222 may also select and control the branching function 208, the first anchor 210, and the second anchor 212 for data transfer.

The SMF 222 may configure the branching function 208 for a multi-homed PDU session. For example, the SMF 222 may assign a first prefix for communications between the UE 204 and the first anchor 210, and assign a second prefix for traffic between the UE 204 and the second anchor 212. The SMF 222 may configure the branching function 208 to direct traffic based on a prefix associated with the traffic. The branching function 208 may be inserted or removed by the SMF 222 as PDU session anchors are added or removed. Further, the SMF 222 may request the two PDU session anchors to send a router advertisement to manage the two PDU sessions. For instance, a router advertisement with a route information option may be used to configure rules into the UE 204 to influence the selection of the prefix.

Figure 3:
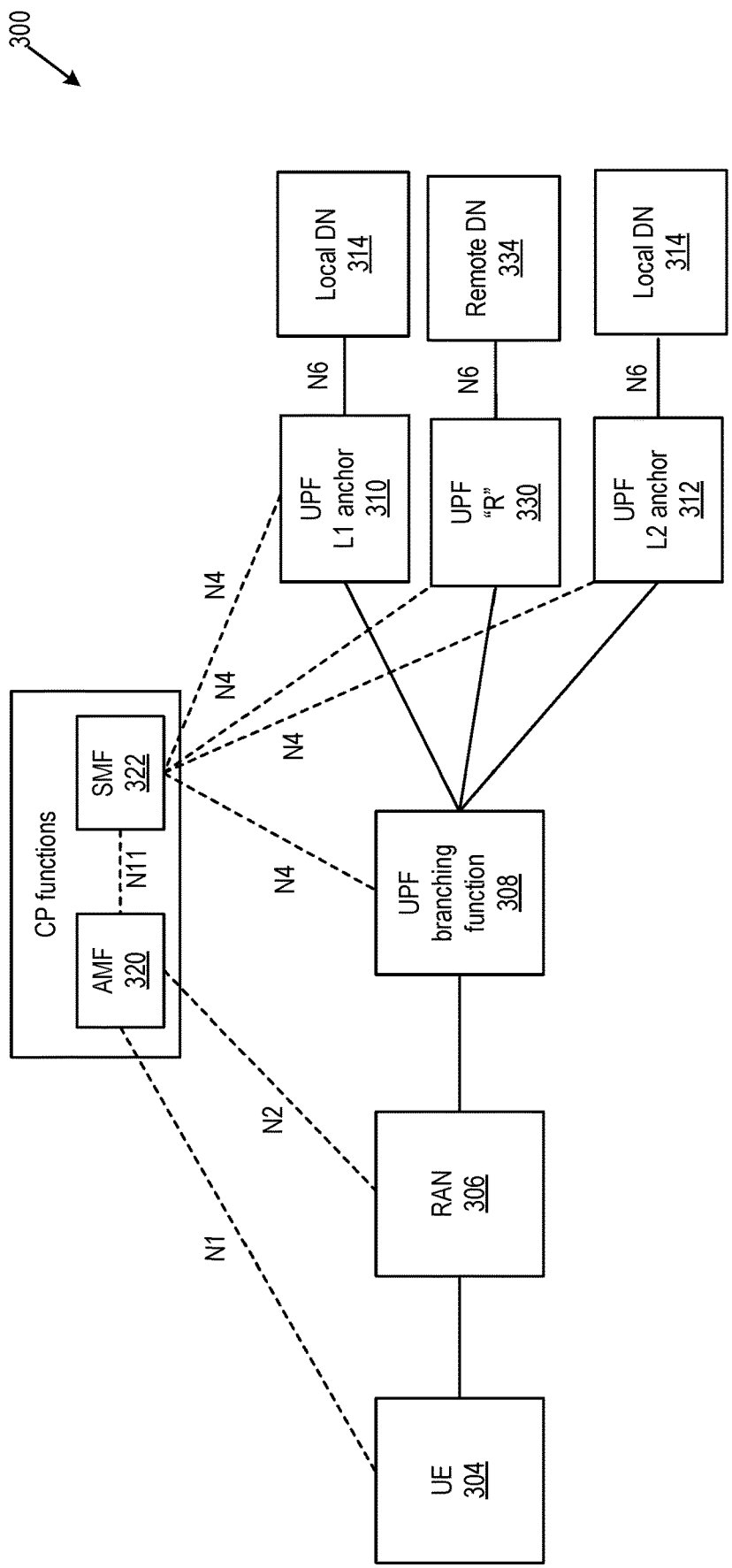
FIG. 3 illustrates a block diagram of a multi-homed PDU session established for service continuity and concurrent access between a UE and multiple data networks, according to one embodiment.

FIG. 3 illustrates a block diagram of a multi-homed PDU session 300 established for service continuity and concurrent access between a UE 304 and multiple data networks, according to one embodiment. The multi-homed PDU session 300 is a combination of the multi-homed PDU session 100 for service continuity of FIG. 1, and the multi-homed PDU session 200 for concurrent access to multiple data networks of FIG. 2. Accordingly, the UE 304, RAN 306, branching function 308, and AMF 320 perform functions as disclosed with relation to FIGS. 1-2.

The multi-homed PDU session 300 provides the UE 304 with access to a remote data network 334 and a local data network 314. Additionally, the UE 304 is connected to the local data network 314 through two PDU data session anchors (i.e., L1 anchor 310 and L2 anchor 312). Thus, the UE 304 may provide service continuity for the local data network 314. For example the multi-homed PDU session 300 may be used to support make-before-break session and service continuity mode 3 (SSC mode 3).

To provide service continuity on the local data network 314 and access to the remote data network 334, the SMF 322 may provide prefixes for the L1 anchor 310, a remote anchor 330 and the L2 anchor 312. The SMF 322 may configure the branching function 308 to steer the uplink traffic towards one of the anchors based on the prefix of the uplink packet, and merge downlink traffic from both the PDU session anchors to the UE 304.

Figure 4:
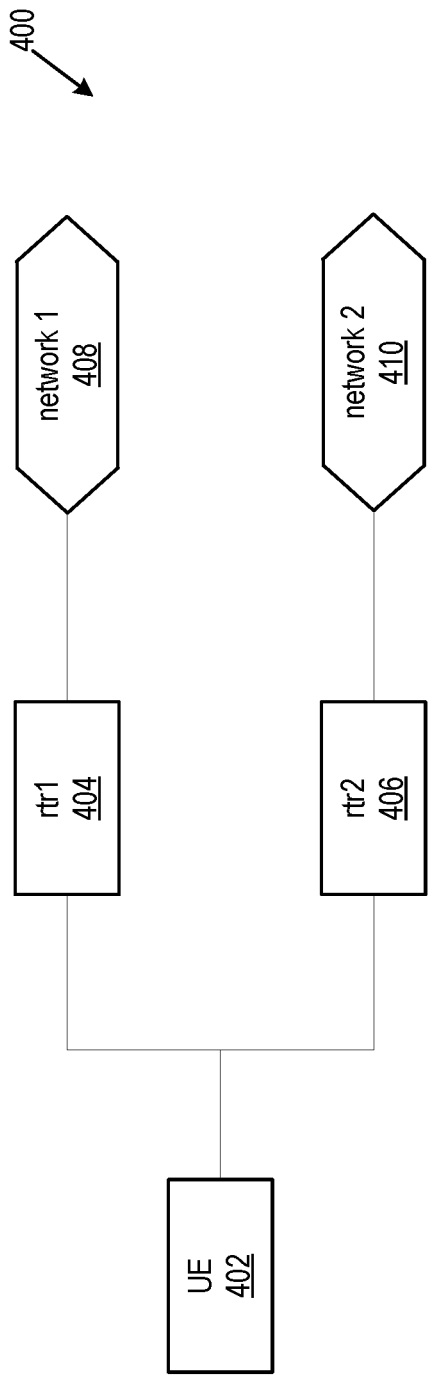
FIG. 4 illustrates a block diagram of a UE connected to multiple data networks via multiple routers, each connecting to a different data network, according to one embodiment.

FIG. 4 illustrates a block diagram of a UE connected to multiple data networks via multiple routers, each connecting to a different data network, according to one embodiment. (scenario 400), according to one embodiment. A UE 402 is offered multiple anchors or prefixes from a plurality of different routers for a multi-homed data session. While only two routers are shown (rtr1 404 and rtr2 406), more routers may be used to form additional PDU session anchors.

In the scenario 400, two or more routers are present on a single link shared with the UE sometimes referred to as host. Each router is, in turn, connected to a different service provider network (e.g., first network 408 and second network 410). The different service providers provide independent address assignment and domain name system (DNS) recursive name servers. The UE 402 or host in this environment would be offered multiple anchors with different prefixes and DNS recursive name servers advertised from the two different routers.

FIG. 4 illustrates the host UE 402 connecting to rtr1 404 and rtr2 406 via a shared link. First network 408 is reachable via rtr1 404, and the second network 410 is reachable via rtr2 406. When the UE 402 sends packets to first network 408, the next hop is rtr1 404. Similarly, rtr2 406 is the next hop to second network 410. In some embodiments, the first network 408 and the second network 410 may be multiple broadband service providers (e.g., Internet, VoIP, IPTV, etc.). In this approach, there is more than one router on the link with the terminal device (host or UE).

The scenario 400 may be configured for service continuity (e.g., the multi-homed PDU session 100 of FIG. 1), concurrent access (e.g., the multi-homed PDU session 200 of FIG. 2), or a combination of service continuity and concurrent access (e.g., the multi-homed PDU session 300 of FIG. 3). Embodiments herein relate to how to utilize the architecture described as scenario 400 (two routers on the same link and each router connecting to a separate network) and router advertisement extensions, to address the following use cases: (1) concurrent access, (2) service continuity support, and (3) a combination of both. One benefit of embodiments using an architecture with two routers on the same link is the ability to support the multi-homed PDU sessions using only the user plane (no additional control plane support is required).

Various embodiments may use a router advertisement extension to support the requirements of the multi-homed PDU session. One benefit to embodiments using scenario 400 is the ability to support the use cases discussed above using only the user plane (no additional control plane support is required). Rtr1 404 and rtr2 406 may reside in the UPFs serving as PDU session anchors. Router advertisement may be used to configure the concurrent access multi-homed PDU session. For instance, a route information option (RIO) may be used by each router to advertise destination prefixes, route lifetime and a route preference. The route preference can take one of three possible values (High, Medium (Default), or Low).

Figure 4A:
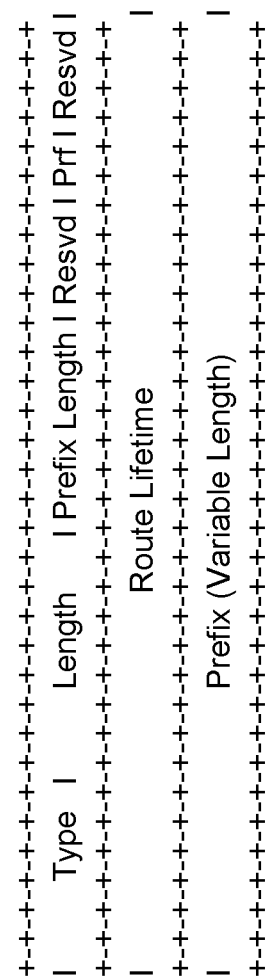
FIG. 4A is an RIO according to one embodiment.

An RIO may be formatted as shown in FIG. 4A.

In some embodiments the fields may be as follows. The Type may be 24, and the length may be an 8-bit unsigned integer. The length of the option (including the Type and Length fields) may be in units of 8 octets. The Length field may 1, 2, or 3 depending on the Prefix Length. If Prefix Length is greater than 64, then Length can be 3. If Prefix Length is greater than 0, then Length can be 2 or 3. If Prefix Length is zero, then Length can be 1, 2, or 3.

The Prefix Length may be an 8-bit unsigned integer. The number of leading bits in the Prefix that are valid. The value ranges from 0 to 128. The Prefix field can 0, 8, or 16 octets depending on the Length.

The Prf (Route Preference) can be a 2-bit signed integer. The Route Preference indicates whether to prefer the router associated with this prefix over others, when multiple identical prefixes (for different routers) have been received. If the Reserved (10) value is received, the RIO can be ignored.

The Resvd (Reserved) field may be two 3-bit unused fields. They can be initialized to zero by the sender and can be ignored by the receiver.

The Route Lifetime field can be a 32-bit unsigned integer representing the length of time in seconds (relative to the time the packet is sent) that the prefix is valid for route determination. A value of all one bits (0xffffffff) represents infinity.

The Prefix field can be a variable-length field containing an IP address or a prefix of an IP address. The Prefix Length field contains the number of valid leading bits in the prefix. The bits in the prefix after the prefix length (if any) are reserved and can be initialized to zero by the sender and ignored by the receiver.

Concurrent Access to Local and Remote Data Network Using Scenario 400

To provide concurrent access to local and remote data networks as illustrated in the multi-homed PDU session 200 of FIG. 2, the scenario 400 can initially establish the PDU session as a simple PDU session (i.e., with only one IPv6 prefix). For example, the simple PDU session may be used by the UE 402 to access a remote DN. At some point the network decides to assign a new PDU session anchor and a new IPv6 prefix that is used by the UE 402 to access a local DN.

Each of the two PDU session anchors acts as a router (e.g., rtr1 404 and rtr2 406 of FIG. 4). In some embodiments, the SMF (e.g., SMF 222 of FIG. 2) that controls both PDU session anchors configures them to advertise destination routes (i.e., prefixes) using an RIO for the router advertisement message as follows:

1) the PDU session anchor providing access to the local DN advertises the route(s) to the local network with a higher priority than the other router (e.g., the Prf parameter set to "Medium (default)"); and
2) the PDU session anchor providing access to the remote DN advertises the prefix ::/0 (all destinations) with the Prf parameter set to "Low" priority.

The value—'::/0' means—all destinations. So by assigning the priorities the following is achieved. If the UE wishes to send traffic to a destination in the Local DN, it will use the source IP prefix that arrived with the advertisement of the destination prefix (in the local DN) since the Prf in that advertisement was 'Medium' (which is higher than 'Low'). If the UE wishes to send traffic to an un-advertised destination, it will use the '::/0' (default) entry and send it using the source IP prefix that arrived by the advertisement sent by the router connected to the remote DN. The UE uses a source IP address that was generated from the advertised source IP prefix.

The UE 402 will attempt to use routes on the local network before the remote network because the preference of the PDU session anchor providing access to the local DN is higher than the preference of the PDU session anchor providing access to the remote DN. Based on this information, for all traffic destined to the local DN (as identified by the advertised route(s)), the UE 402 will choose the router in the "local" PDU session anchor. Choosing the router automatically determines the source IPv6 prefix that the UE 402 should use with local traffic.

If the destination address in an IP packet does not match any of the local DN routes, the packet is forwarded to the router in the remote PDU session anchor. To forward the packet to the remote PDU session anchor, the source IPv6 prefix associated with the remote PDU session anchor is used. The remote PDU session anchor may be used without the UE 402 determining if a route is on the remote network since the "default" route was only advertised by the PDU session anchor that provides access to the remote DN.

Service Continuity Using Scenario 400

To provide service continuity to a data network, the UE 402 may be initially engaged in a simple PDU session with only one IPv6 prefix and one PDU session anchor. At some point, due to UE mobility, the current location of PDU session anchor becomes suboptimal and needs to be replaced with another PDU session anchor that resides in a location that is geographically closer to the new UE location. For example, UE 402 may be nearer rtr1 404 at a first location but may move to another location where rtr2 406 is closer.

Accordingly, an original prefix from rtr1 404 may be provided during the simple PDU session, and a new prefix from rtr2 406 may be provided when the UE 402 moves. When the UE 402 is assigned the second IPv6 prefix from a second PDU session anchor (e.g., rtr2 406), the UE 402 may switch from using a source IP address that was derived from the first IP prefix (issued by rtr1 404) in its outgoing packets, to using a new source IP address that is derived from the newer prefix (issued by rtr2 406). As a result of this switch, the traffic will be redirected to flow through rtr2 406 rather than rtr1 404. The the UE 402 may proactively redirect traffic traffic from the old IPv6 prefix to the new IPv6 prefix by using upper layer mechanisms (e.g., MPTCP, SIP reINVITE, DASH, etc.). The UE 402 may also be provided with information about how long the network is willing to keep the old IPv6 prefix.

The redirection of traffic and notification of the lifetime of the old IPv6 prefix may be achieved using a router advertisement (RA) extension. For example, when an SMF configures the new PDU session anchor, the SMF may request the two PDU session anchors (rtr1 404 and rtr2 406) to send a router advertisement to the UE 402.

The router advertisement from PDU session anchor 2 (e.g., rtr2 406) may include the same route information as the one that was previously advertised by PDU session anchor 1 (e.g., rtr1 404). For example, if UE 402 is engaged in a simple PDU session with rtr1 404, all the traffic is directed using the route information provided by a first router advertisement. When a second PDU session with rtr2 406 is initiated, for service continuity, rtr2 406 may send a second router advertisement with the same route information provided by the first router advertisement. To cause the UE 402 to use PDU Session Anchor 2 (e.g., rtr2 406) the route priority associated with the route information from PDU Session Anchor 2 (e.g., rtr2 406) may be higher than the route information from PDU session anchor 1 (e.g., rtr1 404). For example, the second router advertisement may be raised by one degree from the first router advertisement (e.g. "High" if the previous one was "Medium (default)").

Additionally, PDU Session Anchor 1 (e.g., rtr1 404) may be configured to send a new router advertisement message advertising the same route(s) as previously with the same ("Medium (default)") priority, but this time with a route lifetime parameter. The route lifetime parameter may be set to a value that corresponds to the time duration the network is willing to keep the old prefix alive. Thus, after the route lifetime parameter expires, the UE 402 may no longer use the prefix for communications with rtr1 404.

Once PDU session anchor 1 is released, the SMF may configure the remaining PDU session anchor 2 to send a new router advertisement message that is identical to the previous router advertisement message sent by PDU session anchor 2, except that the preference is decreased by one degree (i.e., set to "Medium (default)" instead of "High"). In some embodiments, the route preference parameter supports only three values (Low, Medium (default), and High). In order to cope with future relocation of the PDU session anchor, the SMF can lower the preference of the advertised local route(s).

Combination of Concurrent Access and Service Continuity Using Scenario 400

A combination of concurrent access and service continuity configuration may begin with the UE 402 being engaged with a "local" DN and "remote" DN. The UE may use two separate source IPv6 prefixes for sending packets to the local DN and the remote DN. For example, the first network 408 may be a remote network, and the second network 410 may be a local network. Referring to FIG. 3, the UE 304 may be connected via PDU session anchor L1 (L1 anchor 310) and PDU session anchor "R" (remote anchor 330). The rtr1 404 and rtr2 406 may reside on these PDU session anchors.

At some point, due to UE mobility, the PDU session anchor L1 providing access to the local DN may need to be moved. To achieve the move smoothly, the network configures another PDU session anchor for access to the new local DN (PDU Session Anchor L2). The new PDU session anchor constitutes a third prefix overall for the same multi-homed PDU session.

When the SMF a route priority that is raised by one degree (e.g., Prf is set to "High" if the previous one was "Medium (default)"). At the same time, the local PDU session anchor L1 is configured to send a new router advertisement message advertising the same route(s) as previously with the same ("Medium (default)") priority, but this time with a route lifetime parameter set to a value that corresponds to the time during which the network is willing to keep the old prefix alive.

In some embodiments, once the local PDU session anchor L1 is released, the SMF configures the remaining local PDU session anchor L2 to send a new RA message that is identical to the previous, except that the priority for the local route(s) is decreased by one degree (i.e., set to "Medium (default)" instead of "High"). This facilitates future UE movement in embodiments where the route priority parameter (Prf in RFC 4191) supports only three values (Low, Medium (default), and High). In order to cope with future relocation of the local PDU session anchor L1, the SMF may lower the priority of the advertised local route(s). In contrast, the remote routes may be advertised with Prf set to "Low." Thus, the remote routes may have a low preference value, local routes may have a medium preference value, and local routes associated with a new anchor may have a high preference value.

Figure 5:
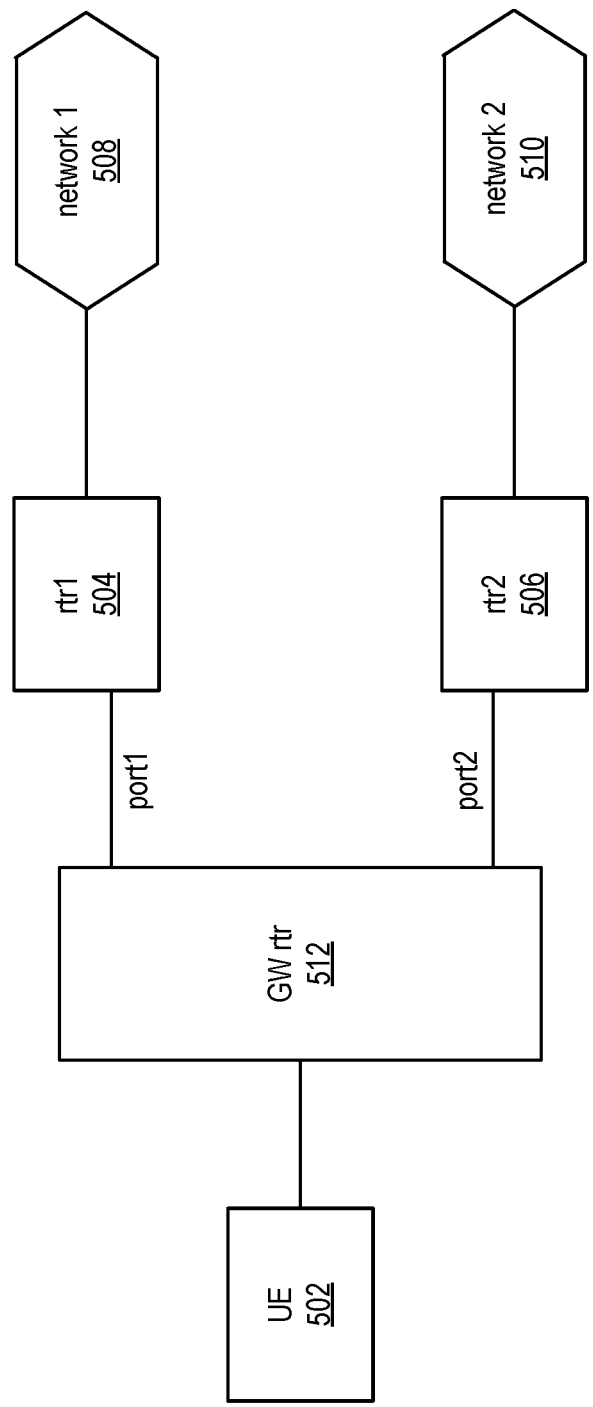
FIG. 5 illustrates a block diagram of a UE connected to multiple data networks via one gateway router that is connected to multiple routers each connecting to a different data network, according to one embodiment

One example advantage of the solution based on scenario 400 is that it does not require any changes to existing RFCs. However, care may be needed when setting the Prf parameter indicating the route preference. Additionally, scenario 400 can address either SSC mode 2 or SSC mode 3 for access to the local data network, but not both because the SSC mode is not indicated in the prefix provided to the UE, and therefore the UE is supposed to know (e.g., by configuration) whether the subsequent prefixes for the local DN are SSC mode 2 or SSC mode 3. And finally, scenario 400 introduces a new type of shared (as opposed to point-to-point) link between the UE and the network and uses special bridge-like handling in the branching point. FIG. 5 bellow describes another approach that may be used to combat possible drawbacks associated with scenario 400.

FIG. 5 illustrates a block diagram of a UE connected to multiple data networks via one gateway router that is connected to multiple routers each connecting to a different data network, according to one embodiment (scenario 500), according to one embodiment. In the scenario 500, a single gateway router 512 connects the host or UE 502 to two or more upstream service provider networks (e.g., first network 508 and second network 510). This gateway router 512 may receive prefix delegations and a different set of DNS recursive name servers from each independent service provider network. The gateway router 512 may, in turn, advertise the provider prefixes to the UE 502, and for DNS, may either act as a lightweight DNS cache server or advertise the complete set of service provider DNS recursive name servers to the hosts. While only two routers are shown (504 and 506), more routers may be used to form additional PDU session anchors.

In the illustrated embodiment, the UE 502 is connected to the gateway router 512. The gateway router 512 connects to the first network 508 via port 1 and connects to the second network 510 via port 2. As the figure shows a logical topology of the scenario 500, in some embodiments, port 1 could be a pseudo interface for tunneling, which connects to the first network 508 through the second network 510 and vice versa. When the UE 502 sends packets to either the first or second network 508, 510, the next hop is the gateway router 512. When the packets are sent to network 1 or network 2, gateway router 512 forwards the packets to port 1 or port 2. For example, the UE 502 may be connected to the internet and a VPN or application service provider.

When using the scenario 500, a router advertisement message is sent to the UE 502 from a single router (the gateway router 512). To support this solution type, new extensions may be defined in the router advertisement message. Scenario 500 may be implemented by having gateway router 512 reside in a UPF serving as the branching point. First router 504 and second router 506 may reside in UPFs serving as PDU session anchors Concurrent Access to Local and Remote Data Network Using Scenario 500

To provide concurrent access to local and remote data networks as illustrated in the multi-homed PDU session 200 of FIG. 2, scenario 500 may initially establish a simple PDU session to a remote PDU session anchor "R" (see e.g., FIG. 3) A legacy router advertisement message can be used to advertise the default (remote) route. Optionally the SSC mode associated with this source prefix may also be advertised. This may be accomplished using a new extension in the router advertisement message.

At some point the network may decide to add a local PDU session anchor "L." The SMF controlling the PDU session may insert a branching function with gateway router 512 functionality in the multi-homed PDU session. The gateway router 512 function may be configured to advertise local route(s) and the associated source IPv6 prefix that the UE can use for the "local" route. The gateway router 512 may also advertise remote route(s) and the associated source IPv6 prefix that the UE can use for the remote route(s). In some embodiments, the gateway router 512 may advertise an SSC mode associated with each source IPv6 prefix.

Service Continuity Using Scenario 500

To provide service continuity to a data network as illustrated in the multi-homed PDU session 100 of FIG. 1, the UE 502 may be initially engaged in a simple PDU session with a first PDU session anchor (via first router 504). A legacy router advertisement message from the single gateway router 512 or from the first router 504 can be used to advertise the default (remote) route. Optionally an SSC mode associated with this source prefix may also be advertised as a new extension in the router advertisement message.

At some point the network may decide to assign a second PDU session anchor (via second router 506 through gateway router 512) that is geographically closer to the current UE location. An SMF controlling the PDU session can insert a "branching function" with gateway router functionality in the multi-homed PDU session and configure the gateway router 512 function to advertise the new prefix associated with the same route(s) as the old prefix, with an indication that the UE should start diverting traffic from an old source prefix to the new source prefix. Additionally, the gateway router 512 can advertise the old prefix that is "linked" to the new prefix ("linked" in the sense that it indicates which one of the old prefixes is being replaced by the new prefix), associated with a timer value indicating how long the network is willing to keep the old prefix. Further, the gateway router 512 may advertise the SSC mode associated with the new source IPv6 prefix.

Combination of Concurrent Access and Service Continuity Using Scenario 500

Scenario 500 may be used to combine the benefits of concurrent access and service continuity. Because the gateway router 512 may explicitly indicate which old prefix is related to the new prefix, there is no need for handling route priorities. Instead, the gateway router 512 may handle the prefixes with the UE 502. For instance, the gateway router 512 may provide a branching point for a remote network and two local networks. The gateway router 512 may link the prefixes of the two local networks and maintain concurrent access with the local networks and the remote network. The UE 502 may be provided the prefixes and the linking information as described above with reference to service continuity and concurrent access individually.

Example advantages of the solution scenario 500 may include that scenario 500 does not use route priorities. Another advantage is that the gateway router 512 may provide explicit signaling of "linked" prefixes for the service continuity and combo scenarios. Further, a centralized source of router advertisement signaling (i.e., from the gateway router 512 function), may lower the volume of router advertisement messages, as well as of C-plane configuration messages from the SMF. Additionally, scenario 500 preserves a point-to-point link between the UE 502 and the network.

Figure 6:
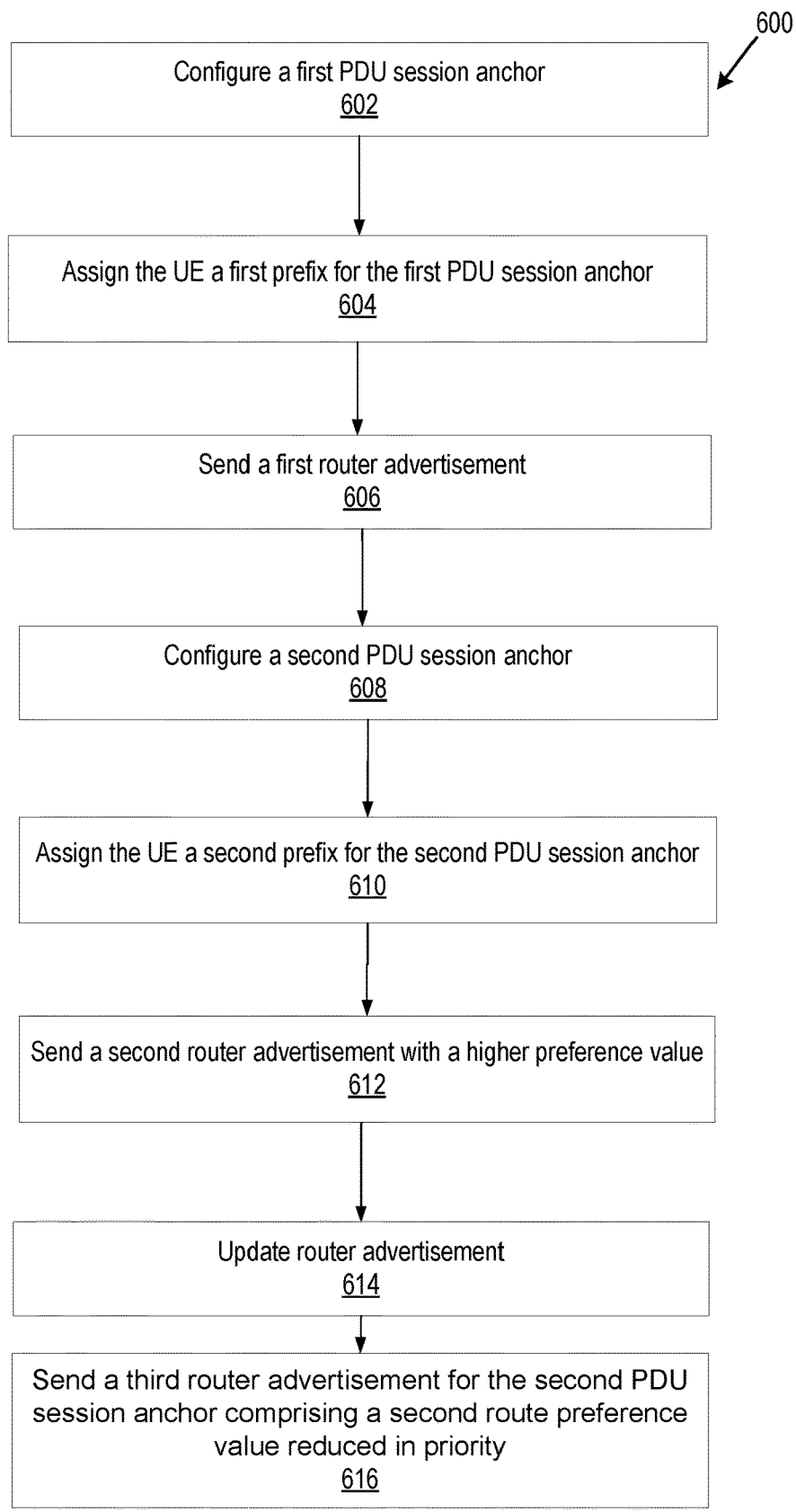
FIG. 6 illustrates a flow chart of a method for providing concurrent access to multiple networks and service continuity using a UE connected to multiple routers as illustrated in FIG. 4.

FIG. 6 illustrates a flow chart of a method 600 for providing concurrent access to multiple networks and service continuity using a UE connected to multiple routers as illustrated in FIG. 4.

One or more processors controlling a user plane function such as an SMF may configure 602 a first PDU session anchor for communications between a UE and a data network, and assign 604 the UE a first prefix for communications through the first PDU session anchor. The first PDU session anchor may be connected with a remote data network or a local data network. A router function may send 606 a first router advertisement for the first PDU session anchor comprising route information and a first route preference value.

The user plane function such as an SMF may configure 608 a second PDU session anchor for communications between a UE and a data network. The data network may be the same data network as associated with the first PDU session anchor to provide service continuity or a different network to provide concurrent access. The SMF may assign 610 the UE a second prefix for communications through the second PDU session anchor. The second PDU session anchor may be connected with a remote data network or a local data network. A router function may send 612 a second router advertisement for the second PDU session anchor comprising route information and a second route preference value that indicates higher priority than the first route preference value, wherein the higher priority of the second route preference value indicates to the UE to use the second PDU session anchor and the second prefix for routes for communications when possible. In some embodiments, the second PDU session anchor is configured when the UE is closer to the second PDU session anchor than the first PDU session anchor.

The router function may update 614 the router advertisement and preference value. For example, in a service continuity scenario a route lifetime parameter may be assigned comprising a value that corresponds to a time duration during which the first PDU session will maintain the first prefix. In some embodiments, the router function may, after the route lifetime parameter expires, send 616 a third router advertisement for the second PDU session anchor comprising a second route preference value reduced in priority. Additional session anchors may be added to provide service continuity and concurrent access to multiple networks.

Figure 7:
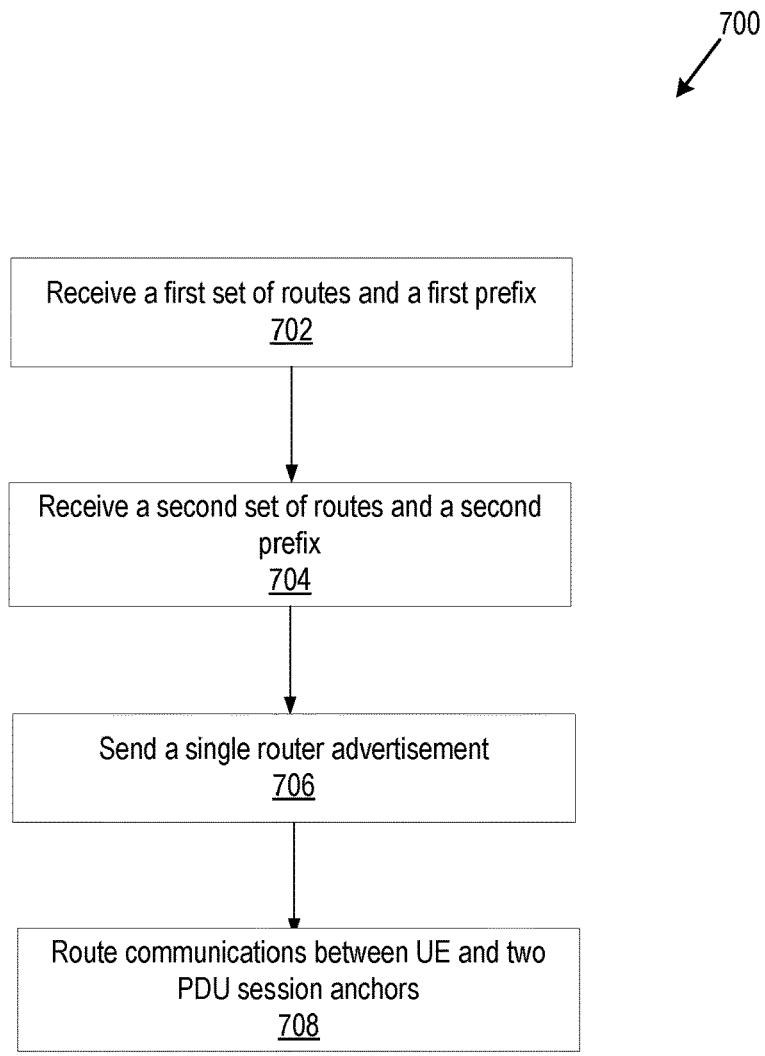
FIG. 7 illustrates a flow chart of a method for providing concurrent access to multiple networks and service continuity using a UE connected to multiple data networks via one gateway router that is connected to multiple routers as illustrated in FIG. 5.

FIG. 7 illustrates a flow chart of a method 700 for providing concurrent access to multiple networks and service continuity using a UE connected to multiple data networks via one gateway router that is connected to multiple routers as illustrated in FIG. 5. A gateway router may receive 702, via a first port, a first set of routes and a first prefix for communications between a first PDU session anchor and a UE. The gateway router may further receive 704, via a second port, a second set of routes and a second prefix for communications between a second PDU session anchor and the UE. The gateway router may advertise 706, via a single communications link, the first and second sets of routes and the first and second prefixes to the UE. Additionally, the gateway router may route 708 communications between the UE and the first and second PDU session anchors through the single communications link to the first port and the second port.

Figure 8:
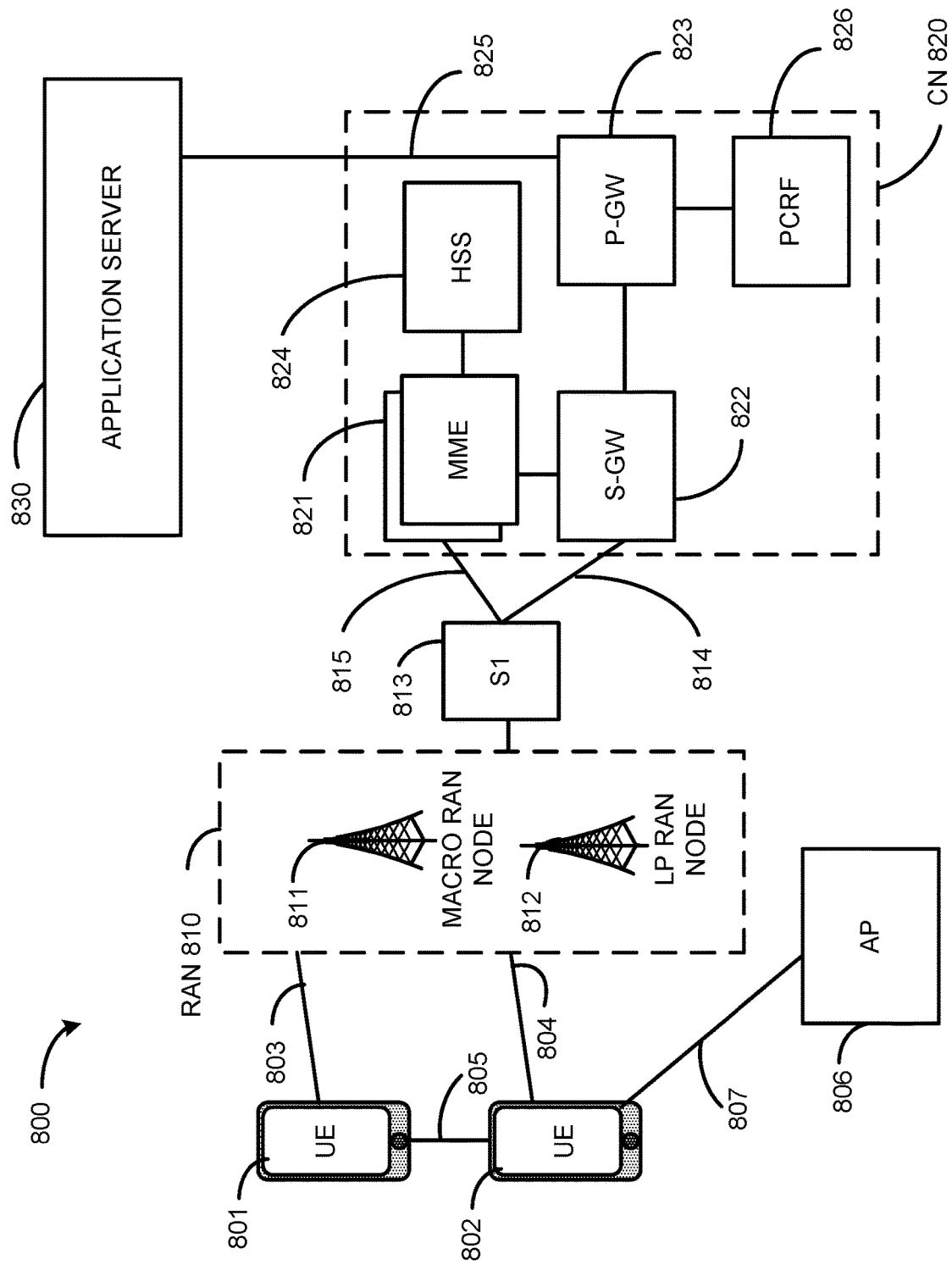
FIG. 8 illustrates an architecture of a system of a network in accordance with some embodiments.

FIG. 8 illustrates an architecture of a system 800 of a network in accordance with some embodiments. The system 800 is shown to include a user equipment (UE) 801 and a UE 802. The UEs 801 and 802 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 801 and 802 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 801 and 802 may be configured to connect, e.g., communicatively couple, with a radio access network (RAN) 810. The RAN 810 may be, for example, an Evolved Universal Mobile Telecommunications System (UMTS) Terrestrial Radio Access Network (E-UTRAN), a NextGen RAN (NG RAN), or some other type of RAN. The UEs 801 and 802 utilize connections 803 and 804, respectively, each of which comprises a physical communications interface or layer (discussed in further detail below); in this example, the connections 803 and 804 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 801 and 802 may further directly exchange communication data via a ProSe interface 805. The ProSe interface 805 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 802 is shown to be configured to access an access point (AP) 806 via connection 807. The connection 807 can comprise a local wireless connection, such as a connection consistent with any IEEE 802.11 protocol, wherein the AP 806 would comprise a wireless fidelity (WiFi®) router. In this example, the AP 806 may be connected to the Internet without connecting to the core network of the wireless system (described in further detail below).

The RAN 810 can include one or more access nodes that enable the connections 803 and 804. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 810 may include one or more RAN nodes for providing macrocells, e.g., macro RAN node 811, and one or more RAN nodes for providing femtocells or picocells (e.g., cells having smaller coverage areas, smaller user capacity, or higher bandwidth compared to macrocells), e.g., low power (LP) RAN node 812.

Any of the RAN nodes 811 and 812 can terminate the air interface protocol and can be the first point of contact for the UEs 801 and 802. In some embodiments, any of the RAN nodes 811 and 812 can fulfill various logical functions for the RAN 810 including, but not limited to, radio network controller (RNC) functions such as radio bearer management, uplink and downlink dynamic radio resource management and data packet scheduling, and mobility management.

In accordance with some embodiments, the UEs 801 and 802 can be configured to communicate using Orthogonal Frequency-Division Multiplexing (OFDM) communication signals with each other or with any of the RAN nodes 811 and 812 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 811 and 812 to the UEs 801 and 802, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 801 and 802. The physical downlink control channel (PDCCH) may carry information about the transport format and resource allocations related to the PDSCH channel, among other things. It may also inform the UEs 801 and 802 about the transport format, resource allocation, and H-ARQ (Hybrid Automatic Repeat Request) information related to the uplink shared channel. Typically, downlink scheduling (assigning control and shared channel resource blocks to the UE 802 within a cell) may be performed at any of the RAN nodes 811 and 812 based on channel quality information fed back from any of the UEs 801 and 802. The downlink resource assignment information may be sent on the PDCCH used for (e.g., assigned to) each of the UEs 801 and 802.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 810 is shown to be communicatively coupled to a core network (CN) 820—via an S1 interface 813. In embodiments, the CN 820 may be an evolved packet core (EPC) network, a NextGen Packet Core (NPC) network, or some other type of CN. In this embodiment the S1 interface 813 is split into two parts: the S1-U interface 814, which carries traffic data between the RAN nodes 811 and 812 and a serving gateway (S-GW) 822, and an S1-mobility management entity (MME) interface 815, which is a signaling interface between the RAN nodes 811 and 812 and MMEs 821.

In this embodiment, the CN 820 comprises the MMEs 821, the S-GW 822, a Packet Data Network (PDN) Gateway (P-GW) 823, and a home subscriber server (HSS) 824. The MMEs 821 may be similar in function to the control plane of legacy Serving General Packet Radio Service (GPRS) Support Nodes (SGSN). The MMEs 821 may manage mobility aspects in access such as gateway selection and tracking area list management. The HSS 824 may comprise a database for network users, including subscription-related information to support the network entities' handling of communication sessions. The CN 820 may comprise one or several HSSs 824, depending on the number of mobile subscribers, on the capacity of the equipment, on the organization of the network, etc. For example, the HSS 824 can provide support for routing/roaming, authentication, authorization, naming/addressing resolution, location dependencies, etc.

The S-GW 822 may terminate the S1 interface 813 towards the RAN 810, and routes data packets between the RAN 810 and the CN 820. In addition, the S-GW 822 may be a local mobility anchor point for inter-RAN node handovers and also may provide an anchor for inter-3GPP mobility. Other responsibilities may include lawful intercept, charging, and some policy enforcement.

The P-GW 823 may terminate an SGi interface toward a PDN. The P-GW 823 may route data packets between the CN 820 (e.g., an EPC network) and external networks such as a network including the application server 830 (alternatively referred to as application function (AF)) via an Internet Protocol (IP) interface 825. Generally, an application server 830 may be an element offering applications that use IP bearer resources with the core network (e.g., UMTS Packet Services (PS) domain, LTE PS data services, etc.). In this embodiment, the P-GW 823 is shown to be communicatively coupled to an application server 830 via an IP communications interface 825. The application server 830 can also be configured to support one or more communication services (e.g., Voice-over-Internet Protocol (VoIP) sessions, PTT sessions, group communication sessions, social networking services, etc.) for the UEs 801 and 802 via the CN 820.

The P-GW 823 may further be a node for policy enforcement and charging data collection. A Policy and Charging Enforcement Function (PCRF) 826 is the policy and charging control element of the CN 820. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 826 may be communicatively coupled to the application server 830 via the P-GW 823. The application server 830 may signal the PCRF 826 to indicate a new service flow and select the appropriate Quality of Service (QoS) and charging parameters. The PCRF 826 may provision this rule into a Policy and Charging Enforcement Function (PCEF) (not shown) with the appropriate traffic flow template (TFT) and QoS class of identifier (QCI), which commences the QoS and charging as specified by the application server 830.

Figure 9:
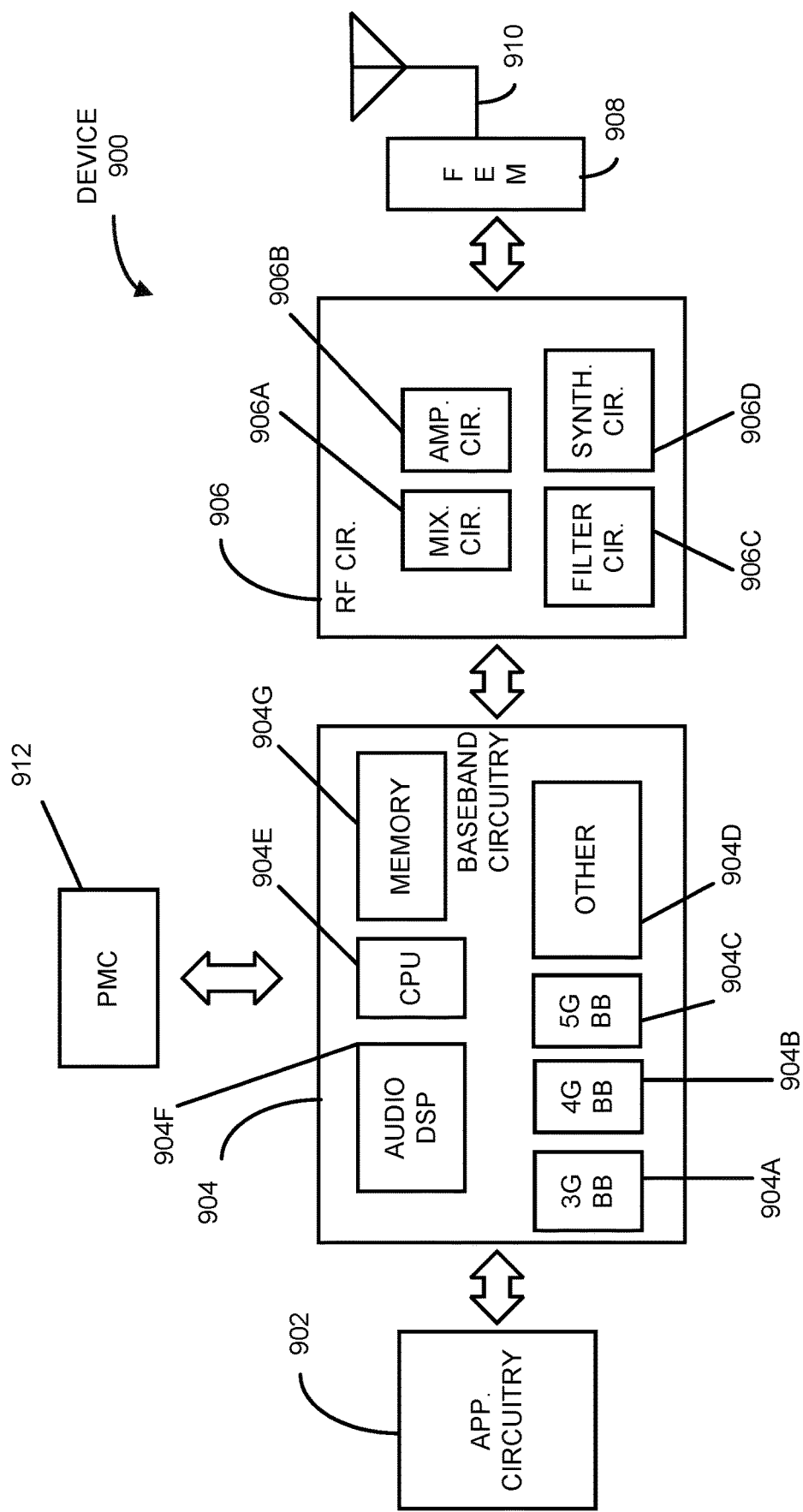
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. The RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by the filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. The FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by the RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device 900 is included in a UE. The PMC 912 may increase the power conversion efficiency while providing desirable implementation size and heat dissipation characteristics.

FIG. 9 shows the PMC 912 coupled only with the baseband circuitry 904. However, in other embodiments, the PMC 912 may be additionally or alternatively coupled with, and perform similar power management operations for, other components such as, but not limited to, the application circuitry 902, the RF circuitry 906, or the FEM circuitry 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
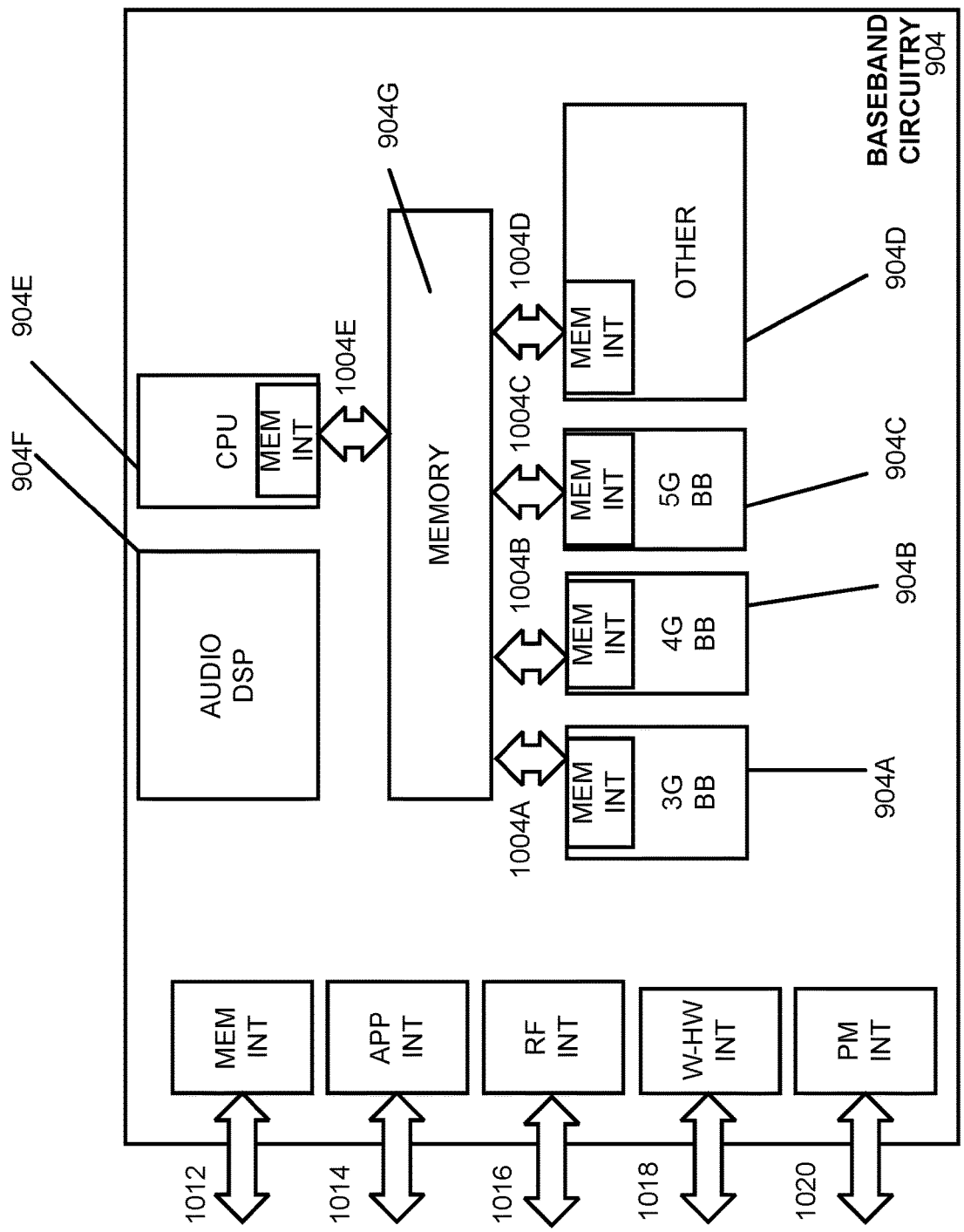
FIG. 10 illustrates example interfaces of baseband circuitry in accordance with some embodiments.

FIG. 10 illustrates example interfaces of baseband circuitry in accordance with some embodiments. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

Figure 11:
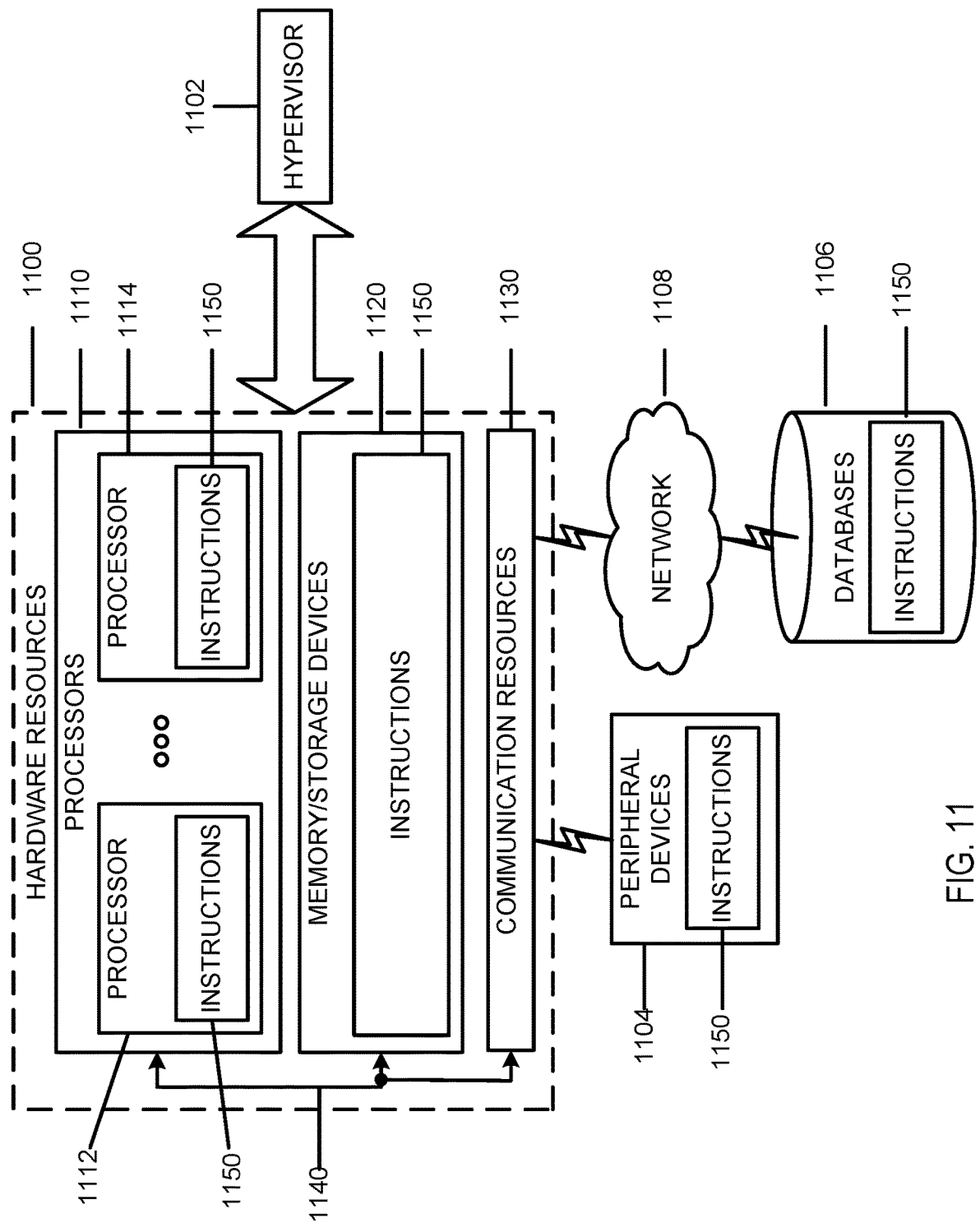
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

EXAMPLES

The following are examples of further embodiments.

Example 1 is an apparatus for user equipment (UE), comprising: a memory interface to access and a baseband processor circuitry. The memory interface to access, from a memory device, a first router advertisement message from a first Protocol Data Unit (PDU) session anchor on a first data network and a second router advertisement message from a second PDU session anchor on a second data network. The baseband processor circuitry to: decode the first and second router advertisement messages; identify, based on the first and second router advertisement messages, a first preference value associated with destination routes of the first data network, and a second preference value associated with destination routes of the second data network; determine a destination data network for a packet by comparing a destination route of the packet to destination routes associated with whichever data network has a greater preference value; and prepare the packet with a prefix based on the destination data network.

Example 2 is the apparatus for UE of Example 1, wherein the first data network is a local data network, and the second data network is a remote data network.

Example 3 is the apparatus for UE of Example 2, wherein the local data network is associated with a greater preference value than the remote data network.

Example 4 is the apparatus for UE according to any one of Examples 1-3, wherein to determine the destination data network, if no destination routes associated with the data network with the greater preference value correspond with the destination route of the packet, the baseband processor circuitry determines that the destination data network is whichever data network has a lower preference value.

Example 5 is the apparatus for UE according to any one of Examples 1-3, wherein to identify the first and second preference values, the baseband processor circuitry identifies a route preference parameter in a route information option of the first and second router advertisement messages.

Example 6 is the apparatus for UE according to any one of Examples 1-3, wherein the memory interface is further to access a third router advertisement message from a third PDU session anchor on the first data network; and the baseband processor circuitry is further to: decode the third router advertisement message, and identify, based on the third router advertisement message, a third preference value associated with destination routes of the first data network on the third PDU session anchor, wherein the third preference value is greater than the first preference value.

Example 7 is the apparatus for UE of Example 6, wherein to determine the destination data network for the packet, the baseband processor circuitry compares the destination routes of the first data network on the third PDU session anchor before the destination routes of the first data network on the first PDU session anchor because the third preference value is greater than the first preference value.

Example 8 is the apparatus for UE of Example 6, wherein the first router advertisement message comprises a route lifetime parameter comprising a value that corresponds to a time duration the first data network will maintain a prefix associated with the first PDU session anchor.

Example 9 is the apparatus for UE of Example 8, wherein after the route lifetime parameter expires, the baseband processor circuitry no longer uses a prefix associated with the first PDU session anchor.

Example 10 is the apparatus for UE of Example 6, wherein after the route lifetime parameter expires, the baseband processor circuitry decreases the third preference value.

Example 11 is a non-transitory computer-readable medium including instruction, when executed by one or more processors controlling a user plane function, to: configure a first Protocol Data Unit (PDU) session anchor for communications between a user equipment (UE) and a data network; assign the UE a first prefix for communications through the first PDU session anchor; send a first router advertisement for the first PDU session anchor comprising route information and a first route preference value; configure a second PDU session anchor for communications between the UE and the data network; assign the UE a second prefix for communications through the second PDU session anchor; and send a second router advertisement for the second PDU session anchor comprising the route information of the first router advertisement and a second route preference value that indicates higher priority than the first route preference value, wherein the higher priority of the second route preference value indicates to the UE to use the second PDU session anchor and the second prefix for routes for communications when possible.

Example 12 is the non-transitory computer-readable medium of Example 11, wherein the second PDU session anchor is configured when the UE is closer to the second PDU session anchor than the first PDU session anchor.

Example 13 is the non-transitory computer-readable medium of Example 11, further to assign a route lifetime parameter comprising a value that corresponds to a time duration during which the first PDU session anchor will maintain the first prefix.

Example 14 is the non-transitory computer-readable medium of Example 13, further to, after the route lifetime parameter expires, send a third router advertisement for the second PDU session anchor comprising the route information of the first router advertisement and the second route preference value reduced in priority.

Example 15 is the non-transitory computer-readable medium according to any one of Examples 11-14, further to: configure a third PDU session anchor for communications between the UE and the data network; assign the UE a third prefix for communications through the third PDU session anchor; and send a fourth router advertisement for the third PDU session anchor comprising additional route information and a third route preference value with lower priority than the first and second route preference values.

Example 16 is the non-transitory computer-readable medium of Example 15, wherein the first and second PDU session anchors are for communications between the UE and a local data network, and the third PDU session anchor is for communications between the UE and a remote data network.

Example 17 is a method comprising: receiving, via a first port, a first set of routes and a first prefix for communications between a first Protocol Data Unit (PDU) session anchor and a user equipment (UE); receiving, via a second port, a second set of routes and a second prefix for communications between a second PDU session anchor and the UE; advertising, via a single communications link, the first and second sets of routes and the first and second prefixes to the UE; and routing communications between the UE and the first and second PDU session anchors through the single communications link to the first port and the second port.

Example 18 is the method of Example 17, wherein the first PDU session anchor is associated with a local data network, and the second PDU session anchor is associated with a remote data network.

Example 19 is the method of Example 18, wherein the first set of routes and the first prefix are used for routing communication between the UE and the local data network, and wherein the second set of routes and the second prefix are used for routing communication between the UE and the remote data network.

Example 20 is the method of Example 17, wherein the first PDU session anchor and the second PDU session anchor are associated with a same data network, and the first and second sets of routes are the same.

Example 21 is the method of Example 20, further comprising indicating that the UE should divert communications from the first prefix to the second prefix.

Example 22 is the method of Example 20, further comprising advertising a timer value indicating how long the first prefix will be usable.

Example 23 is the method of Example 20, indicating that the first prefix is being replaced by the second prefix.

Example 24 is the method according to any one of Examples 17-24, further comprising receiving a third set of routes and a third prefix for communications between a third PDU session anchor associated with a remote data network and the UE; and advertising the third set of routes and the third prefix to the UE, wherein routing communications includes routing communications between the UE and the first, second, and third PDU session anchors.

Example 25 is the method of Example 17, further comprising associating a first SSC mode with the first prefix and a second SSC mode with the second prefix.

Example 26 may include a method for handling a multi-homed PDU session for a 5G system, the multi-homed PDU session being configured according to RFC 7157 Scenario 1.

Example 27 may include the method of example 26 and/or some other example herein, whereby a session management function (SMF) configures the PDU session anchors to send a router advertisement message.

Example 28 may include the method of example 27 and/or some other example herein, whereby the route preference (Prf) parameter in the RFC 4191 route information option (RIO) advertised by the remote PDU session anchor is set to a lower value compared to the Prf parameter advertised by any of the local PDU session anchors.

Example 29 may include the method of example 27 and/or some other example herein, whereby the route preference (Prf) parameter in the RFC 4191 Route Information Option (RIO) advertised by the new local PDU session anchor is set to a higher value compared to the Prf parameter advertised by the old local PDU session anchor.

Example 30 may include the method of example 29 and/or some other example herein, whereby after release of the old local PDU session anchor the SMF configures the new local PDU session anchor to reduce the Prf value for the local route(s) to allow for future re-use of Prf values for service continuity.

Example 31 may include the method for handling a multi-homed PDU session for a 5G system, the multi-homed PDU session being configured according to RFC 7157 Scenario 2.

Example 32 may include the method of example 31 and/or some other example herein, whereby the multi-homed PDU session is configured with a gateway router ("GTW rtr") functionality according to RFC 7157 Scenario 2.

Example 33 may include the method of example 32 and/or some other example herein, whereby an Session Management Function (SMF configures the GTW rtr function to send a router advertisement message with new options.

Example 34 may include the method of example 33 and/or some other example herein, whereby the option contains a set of destination routes (prefixes) associated with a source IPv6 prefix and, optionally, the SSC mode associated with the prefix.

Example 35 may include the method of example 33 and/or some other example herein, whereby the option contains a new source prefix that is linked to an old prefix, associated with the lifetime during which the network is willing to keep the old prefix.

Example 36 may include an apparatus comprising means to perform one or more elements of a method described in or related to any of examples 26-35, or any other method or process described herein.

Example 37 may include one or more non-transitory computer-readable media comprising instructions to cause an electronic device, upon execution of the instructions by one or more processors of the electronic device, to perform one or more elements of a method described in or related to any of examples 26-35, or any other method or process described herein.

Example 38 may include an apparatus comprising logic, modules, and/or circuitry to perform one or more elements of a method described in or related to any of examples 26-35, or any other method or process described herein.

Example 39 may include a method, technique, or process as described in or related to any of examples 26-35, or portions or parts thereof.

Example 40 may include an apparatus comprising: one or more processors and one or more computer-readable media comprising instructions that, when executed by the one or more processors, cause the one or more processors to perform the method, techniques, or process as described in or related to any of examples 26-35, or portions thereof.

Example 41 may include a method of communicating in a wireless network as shown and described herein.

Example 42 may include a system for providing wireless communication as shown and described herein.

Example 43 may include a device for providing wireless communication as shown and described herein.

It will be understood by those having skill in the art that many changes may be made to the details of the above-described embodiments without departing from the underlying principles of the disclosure. The scope of the present invention should, therefore, be determined only by the following claims.

The invention claimed is:

1. An apparatus for user equipment (UE), comprising:
a memory interface to access, from a memory device, a first router advertisement message from a first Protocol Data Unit (PDU) session anchor on a first data network and a second router advertisement message from a second PDU session anchor on a second data network, wherein the first data network is a local data network, and the second data network is a remote data network; and
baseband processor circuitry to:
decode the first and second router advertisement messages, wherein the first advertisement message advertises destination routes of the local network with a first priority preference value that is a medium priority value, and wherein the second advertisement message advertises a default route of the remote data network with a second priority preference value that is a low priority value;
identify, based on the first and second router advertisement messages, the first preference value associated with the destination routes of the local network, and second preference value associated with the default route of the remote data network;
determine a destination data network for a packet by comparing a destination route of the packet to destination routes associated with whichever data network has a greater preference value; and
prepare the packet with a prefix based on the destination data network.

2. The apparatus for UE of claim 1, wherein to determine the destination data network, if no destination routes associated with the data network with the greater preference value correspond with the destination route of the packet, the baseband processor circuitry determines that the destination data network is whichever data network has a lower preference value.

3. The apparatus for UE of claim 1, wherein to identify the first and second preference values, the baseband processor circuitry identifies a route preference parameter in a route information option of the first and second router advertisement messages.

4. The apparatus for UE of claim 1, wherein the memory interface is further to access a third router advertisement message from a third PDU session anchor on the first data network; and
the baseband processor circuitry is further to:
decode the third router advertisement message, and
identify, based on the third router advertisement message, a third preference value associated with destination routes of the first data network on the third PDU session anchor, wherein the third preference value is greater than the first preference value.

5. The apparatus for UE of claim 4, wherein to determine the destination data network for the packet, the baseband processor circuitry compares the destination routes of the first data network on the third PDU session anchor before the destination routes of the first data network on the first PDU session anchor because the third preference value is greater than the first preference value.

6. The apparatus for UE of claim 4, wherein the first router advertisement message comprises a route lifetime parameter comprising a value that corresponds to a time duration the first data network will maintain a prefix associated with the first PDU session anchor.

7. The apparatus for UE of claim 6, wherein after the route lifetime parameter expires, the baseband processor circuitry no longer uses a prefix associated with the first PDU session anchor.

8. The apparatus for UE of claim 4, wherein after the route lifetime parameter expires, the baseband processor circuitry decreases the third preference value.

9. A non-transitory computer-readable medium including instruction, when executed by one or more processors controlling a user plane function, to:
 configure a first Protocol Data Unit (PDU) session anchor for communications between a user equipment (UE) and a data network;
 assign the UE a first prefix for communications through the first PDU session anchor;
 send a first router advertisement for the first PDU session anchor comprising route information and a first route preference value;
 wherein to support a make-before-break handover, the instructions are further to:
  configure a second PDU session anchor for communications between the UE and the data network;
  assign the UE a second prefix for communications through the second PDU session anchor; and
  send a second router advertisement for the second PDU session anchor comprising the route information of the first router advertisement and a second route preference value that indicates higher priority than the first route preference value, wherein the higher priority of the second route preference value indicates to the UE to use the second PDU session anchor and the second prefix for routes for communications when possible.

10. The non-transitory computer-readable medium of claim 9, wherein the second PDU session anchor is configured when the UE is closer to the second PDU session anchor than the first PDU session anchor.

11. The non-transitory computer-readable medium of claim 9, further to assign a route lifetime parameter comprising a value that corresponds to a time duration during which the first PDU session anchor will maintain the first prefix.

12. The non-transitory computer-readable medium of claim 11, further to, after the route lifetime parameter expires, send a third router advertisement for the second PDU session anchor comprising the route information of the first router advertisement and the second route preference value reduced in priority.

13. The non-transitory computer-readable medium of claim 9, further to:
 configure a third PDU session anchor for communications between the UE and the data network;
 assign the UE a third prefix for communications through the third PDU session anchor; and
 send a fourth router advertisement for the third PDU session anchor comprising additional route information and a third route preference value with lower priority than the first and second route preference values.

14. The non-transitory computer-readable medium of claim 13, wherein the first and second PDU session anchors are for communications between the UE and a local data network, and the third PDU session anchor is for communications between the UE and a remote data network.

15. A method for a gateway router, the method comprising:
 receiving, via a first port of the gateway router, a first set of routes and a first prefix for communications between a first Protocol Data Unit (PDU) session anchor and a user equipment (UE);
 receiving, via a second port of the gateway router, a second set of routes and a second prefix for communications between a second PDU session anchor and the UE;
 advertising, via a single router advertisement on a single communications link between the gateway router and the UE, the first and second sets of routes and the first and second prefixes to the UE with; and
 routing communications between the UE and the first and second PDU session anchors through the single communications link to the first port and the second port.

16. The method of claim 15, wherein the first PDU session anchor is associated with a local data network, and the second PDU session anchor is associated with a remote data network.

17. The method of claim 16, wherein the first set of routes and the first prefix are used for routing communication between the UE and the local data network, and
 wherein the second set of routes and the second prefix are used for routing communication between the UE and the remote data network.

18. The method of claim 15, wherein the first PDU session anchor and the second PDU session anchor are associated with a same data network, and the first and second sets of routes are the same.

19. The method of claim 18, further comprising indicating that the UE should divert communications from the first prefix to the second prefix.

20. The method of claim 18, further comprising advertising a timer value indicating how long the first prefix will be usable.

21. The method of claim 18, indicating that the first prefix is being replaced by the second prefix.

22. The method of claim 15, further comprising receiving a third set of routes and a third prefix for communications between a third PDU session anchor associated with a remote data network and the UE; and
 advertising the third set of routes and the third prefix to the UE,
 wherein routing communications includes routing communications between the UE and the first, second, and third PDU session anchors.

23. The method of claim 15, further comprising associating a first SSC mode with the first prefix and a second SSC mode with the second prefix.

* * * * *